(12) United States Patent
Kushner et al.

(10) Patent No.: US 6,883,989 B2
(45) Date of Patent: Apr. 26, 2005

(54) PORTABLE CLEANING DEVICE

(76) Inventors: Robert Gerald Kushner, Flat G, 13th Floor Block G, Merry Terrace, 4 Seymour Road, Mid-levels, Hong Kong (HK); John H Koehler, P.O. Box 3791, Jackson, WY (US) 83001

( * ) Notice: Subject to any disclaimer, the term of this patent is extended or adjusted under 35 U.S.C. 154(b) by 0 days.

(21) Appl. No.: 10/353,700

(22) Filed: Jan. 29, 2003

(65) Prior Publication Data

US 2003/0143016 A1 Jul. 31, 2003

Related U.S. Application Data

(60) Provisional application No. 60/353,749, filed on Jan. 29, 2002.

(51) Int. Cl.[7] .............................. A46B 11/00
(52) U.S. Cl. .................. 401/125; 401/195; 222/192; 206/226
(58) Field of Search ................. 401/125, 195, 401/137, 139; 222/192; 206/225, 226, 229, 233; 242/385.2; 15/149.4, 199.2, 199.3

(56) References Cited

U.S. PATENT DOCUMENTS

| | | | | |
|---|---|---|---|---|
| 603,316 A | * | 5/1898 | Bush | 206/226 |
| 1,255,772 A | * | 2/1918 | Miller | 206/226 |
| 1,523,297 A | * | 1/1925 | Savery | 206/226 |
| 1,582,645 A | * | 4/1926 | Findley | 206/226 |
| 2,098,477 A | * | 11/1937 | Welsh | 221/45 |
| 4,389,132 A | | 6/1983 | Valadez | |
| 4,436,224 A | * | 3/1984 | McInerny | 222/183 |
| 4,516,676 A | * | 5/1985 | Cournoyer | 206/226 |
| 4,796,751 A | | 1/1989 | Madkour | |
| 4,818,134 A | | 4/1989 | Tsai | |
| 4,854,449 A | | 8/1989 | Fitzhugh | |
| 5,000,204 A | | 3/1991 | Smith | |
| 5,083,661 A | | 1/1992 | Burwell | |
| 5,131,112 A | | 7/1992 | Cervini | |
| 5,439,104 A | | 8/1995 | Wolska-Klis | |
| 5,444,890 A | | 8/1995 | Higginson | |
| 5,671,872 A | * | 9/1997 | Daniels, Jr. | 222/192 |
| 5,694,659 A | | 12/1997 | Merrion | |
| 5,819,989 A | * | 10/1998 | Saraceni | 222/192 |
| 6,321,937 B1 | * | 11/2001 | DeSimone et al. | 221/45 |

* cited by examiner

Primary Examiner—Gregory L. Huson
Assistant Examiner—Huyen Le

(57) ABSTRACT

An integrated cleaning system including a casing for storing a cleaning agent, a pump sprayer seated in said casing for dispensing the cleaning agent to a desired surface, a towel for cleaning the desired surface, and a towel stowing mechanism to extend the towel between a first extended position for use and a second stored position for storing the towel in the casing. The towel stowing mechanism may be rotated to stow the towel in the second position. In another embodiment the towel stowing means, when initiated by a user, automatically retracts the towel into the second position.

19 Claims, 6 Drawing Sheets

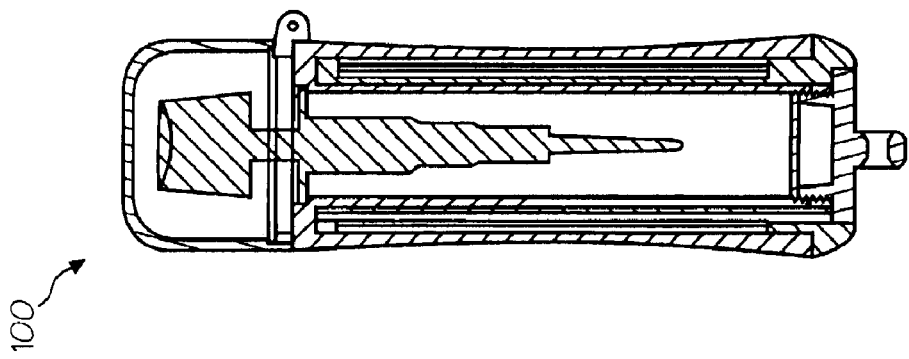
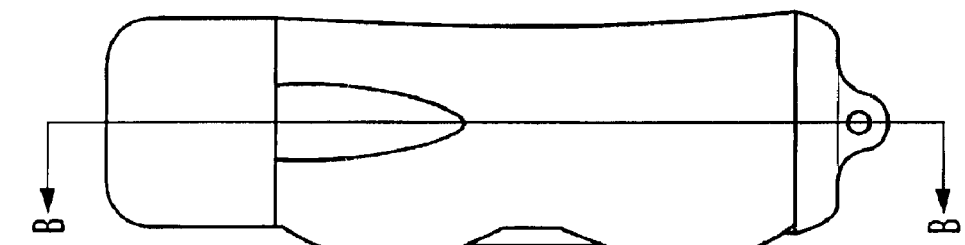
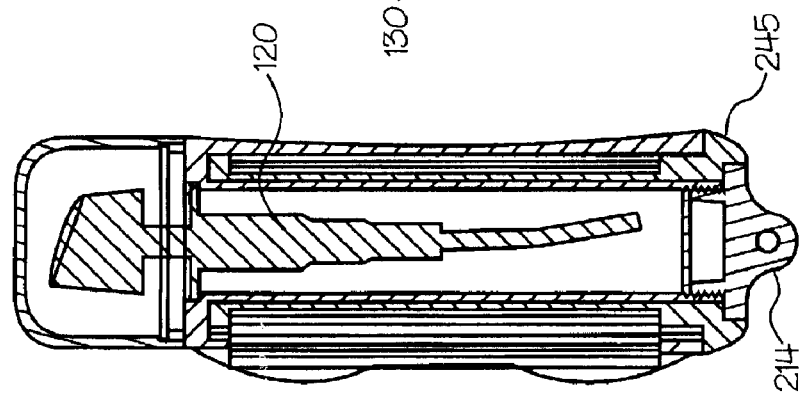
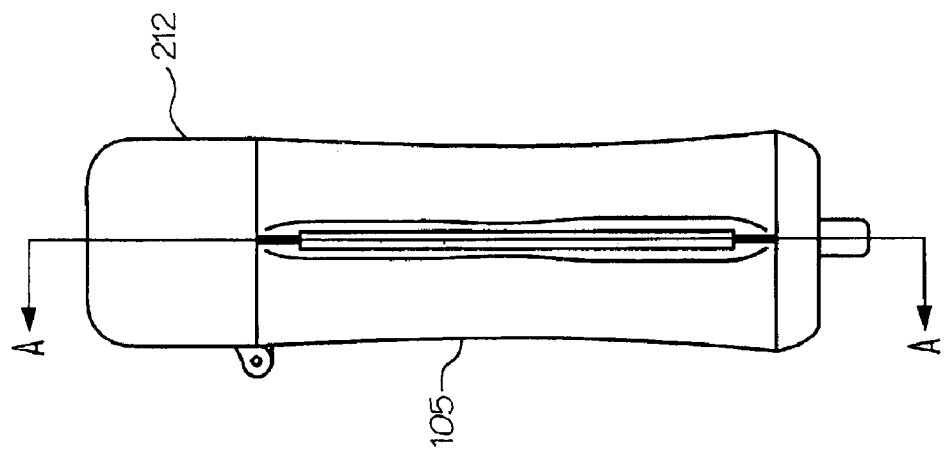
Fig. 3A  Fig. 3B SECTION A-A  Fig. 3C  Fig. 3D SECTION B-B

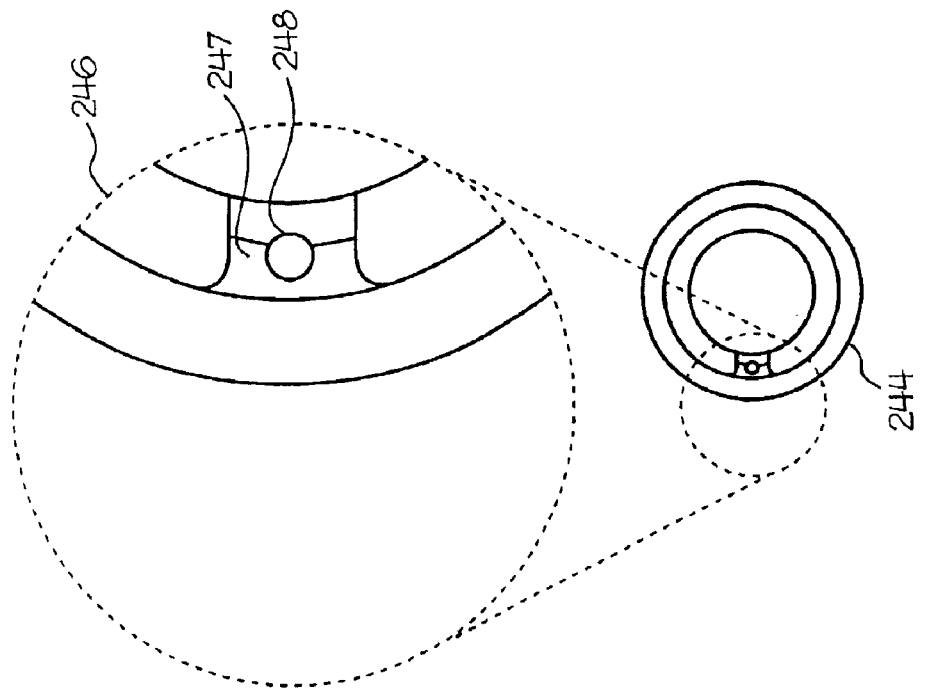
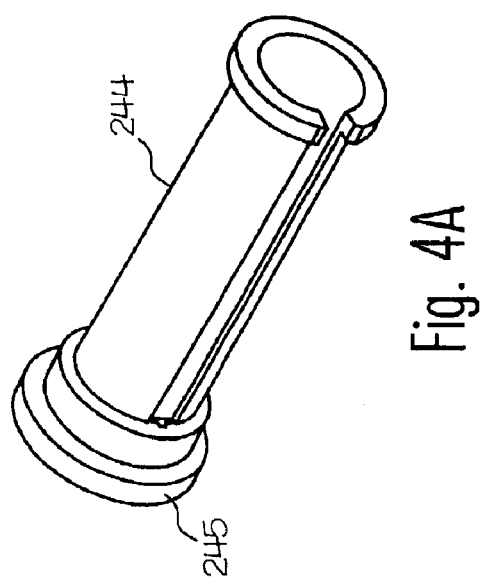
Fig. 4A
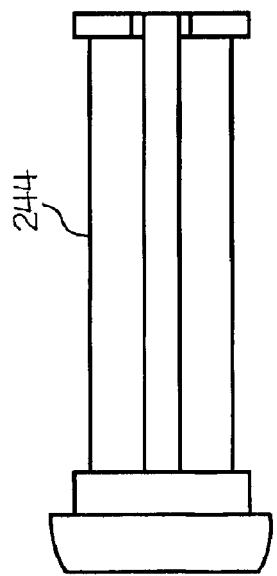
Fig. 4B
Fig. 4C

SECTION C-C

SECTION B-B

SECTION A-A

PORTABLE CLEANING DEVICE

CROSS-REFERENCE TO RELATED APPLICATIONS

This Application claims priority under 35 U.S.C. § 119(e) from U.S. Application Ser. No. 60/353,749 filed on Jan. 29, 2002 and incorporated herein by reference.

BACKGROUND OF THE INVENTION

1. Technical Field

The present invention pertains to a device for cleaning objects such as eyeglasses, sunglasses, lenses, golf balls, mirrors and other items. More particularly, the invention relates to a portable integrated system, which is capable of delivering a cleaning agent to a surface for cleaning and withdrawing the same in a convenient and efficient manner.

2. Background Art

It is frequently necessary to remove dirt, films, moisture and other soiling materials from objects in one's possession, e.g., sunglasses. Often, such soiling materials need to be removed while in transit or away from where conventional cleaning materials may be stored. Previous attempts have been made to provide integrated cleaning systems that are convenient for a user, and some that are portable. Examples of the previous attempts follow.

U.S. Pat. No. 5,439,104 to Wolska-Klis discloses an eyeglass cleaning station including a compartmented housing containing a dispensing bottle of liquid lens cleaning material and a dispensing box of disposable lens cleaning tissue. The eyeglass-cleaning compartment may be placed on a countertop.

U.S. Pat. No. 5,083,661 to Burwell discloses a lens or eyeglass cleaning device having an elongated storage container and a cleaning cloth attached to the container with a retaining cord in a manner that the cloth may be retracted into the container by pulling on an end of the retaining cord opposite the cloth.

U.S. Pat. No. 4,796,751 to Madkour discloses a portable kit for cleaning eyeglass lenses which includes a flat, flexible container having to separately openable compartments, one of the compartments contains a liquid eyeglass lens cleaner absorbed on an absorbent material and the second compartment contains a dry wiping material which may be removed to wipe lens cleaner from a lens.

U.S. Pat. No. 4,389,132 to Valadez and U.S. Pat. No. 4,818,134 to Tsai disclose respective pens for cleaning eyeglasses. The Valadez eyeglass cleaning pen includes felt tip for applying cleaning solution in a first container to a desired surface and a second container serving as a cap and dispenser for a wiping material. The Tsai eyeglass-cleaning pen consists of a similar felt tip pen having at least one spectacle screwdriver removably mounted on the pen body.

The foregoing attempts, and other conventional systems, each have certain drawbacks including; for example, certain of the above-described systems: (i) are not conveniently suitable for portable situations (e.g., the Wolska-Klis eyeglass station); (ii) do not include any cleaning agent whatsoever (e.g. the Burwell device for cleaning eyeglasses) and rely solely on a cleaning cloth for removal of soils (referred to as "dry systems"); and/or (iii) utilize small amounts of cleaning solution, such as the type applied by a felt tip (e.g., Valadez and Tsai pens)(referred to as "semi-dry systems").

Dry systems and semi-dry systems may work in some cases where the soiling material present on the surface to be cleaned is minute and/or has not significantly hardened. However dry and semi-dry systems may damage plastic lenses or UV/polarized coated lenses and can often lead to smearing of the soiling material, as opposed to removal, when a cleaning cloth is applied to a surface dry/semi-dry surface.

Additionally, certain of the conventional systems are complicated and not convenient to use and are suitable only for cleaning eyeglass/sunglass lenses (e.g., the Madkour portable kit for cleaning eyeglass lenses.)

An integrated cleaning system is desired that is relatively simple and compact, convenient to use, effective at removing even stubborn soil and from all types of surfaces and is portable.

BRIEF SUMMARY OF THE INVENTION

In one embodiment of the invention, one or more of the foregoing problems is addressed by providing a portable cleaning device including: a body portion having a space for accommodating a cleaning agent, a towel attached to the body portion that may be used to remove the cleaning agent and/or soils; and a cleaning agent dispensing mechanism that fits into the space for delivering the cleaning agent to a desired location.

In certain embodiments of the invention, the towel is attached to the body portion in a two-position configuration, including a first position for stowing the towel and a second position for using the towel to remove the cleaning agent and/or soils.

According to one embodiment of the invention, the towel is stowed substantially inside of the body when in the first position and the towel is retractably extended substantially outside of the body when in the second position.

According to another aspect of the invention, the towel may be retracted from the second position to the first position by a user initiating a spring retract mechanism.

In other embodiments of the invention, a user may turn a dial to retract the towel from the second position to the first position.

In yet a further embodiment of the invention, the cleaning agent dispensing mechanism includes a spray nozzle and a fluid bottle configured to fit into the space of the body.

In another embodiment of the Invention, the cleaning agent dispensing mechanism includes a spray nozzle that seats into a fluid-containing reservoir formed in the space of the portable cleaning device body.

BRIEF DESCRIPTION OF THE SEVERAL VIEWS OF THE DRAWING

Further aspects, features and advantages of the present invention will become apparent from the following description of the invention in reference to the appended drawing in which like numerals denote like elements and in which:

FIGS. 3A–3B illustrate left and front side and cross-sectional views of the portable cleaning device of FIG. 1;

FIG. 4A-4C illustrate respective perspective, side and end views of a cleaning cloth retracting element according to one embodiment of the invention;

DETAILED DESCRIPTION OF THE INVENTION

Figure 1:
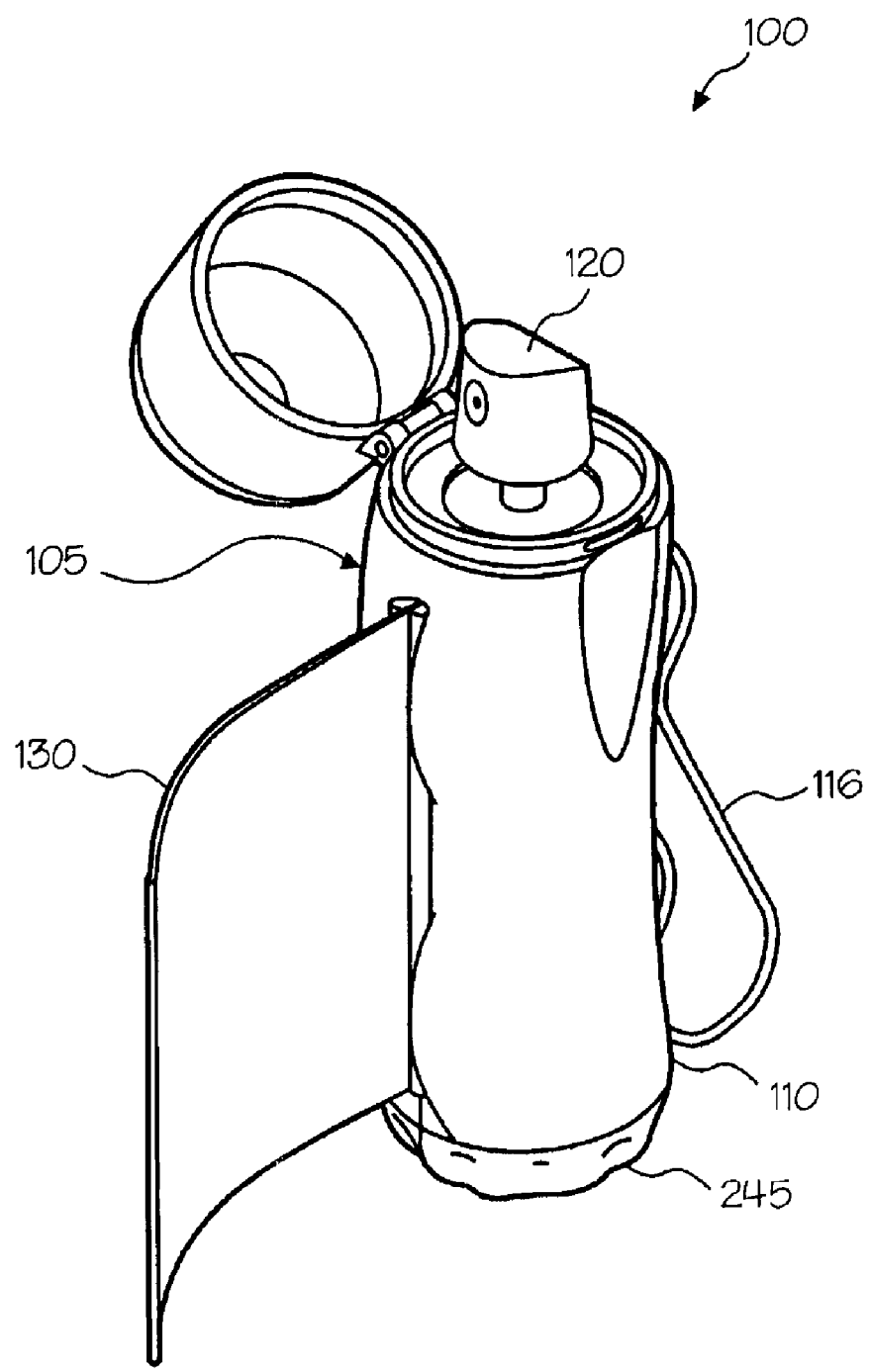
FIG. 1 is a perspective view of a portable cleaning device accordingly to one embodiment of the invention.
Figure 2:
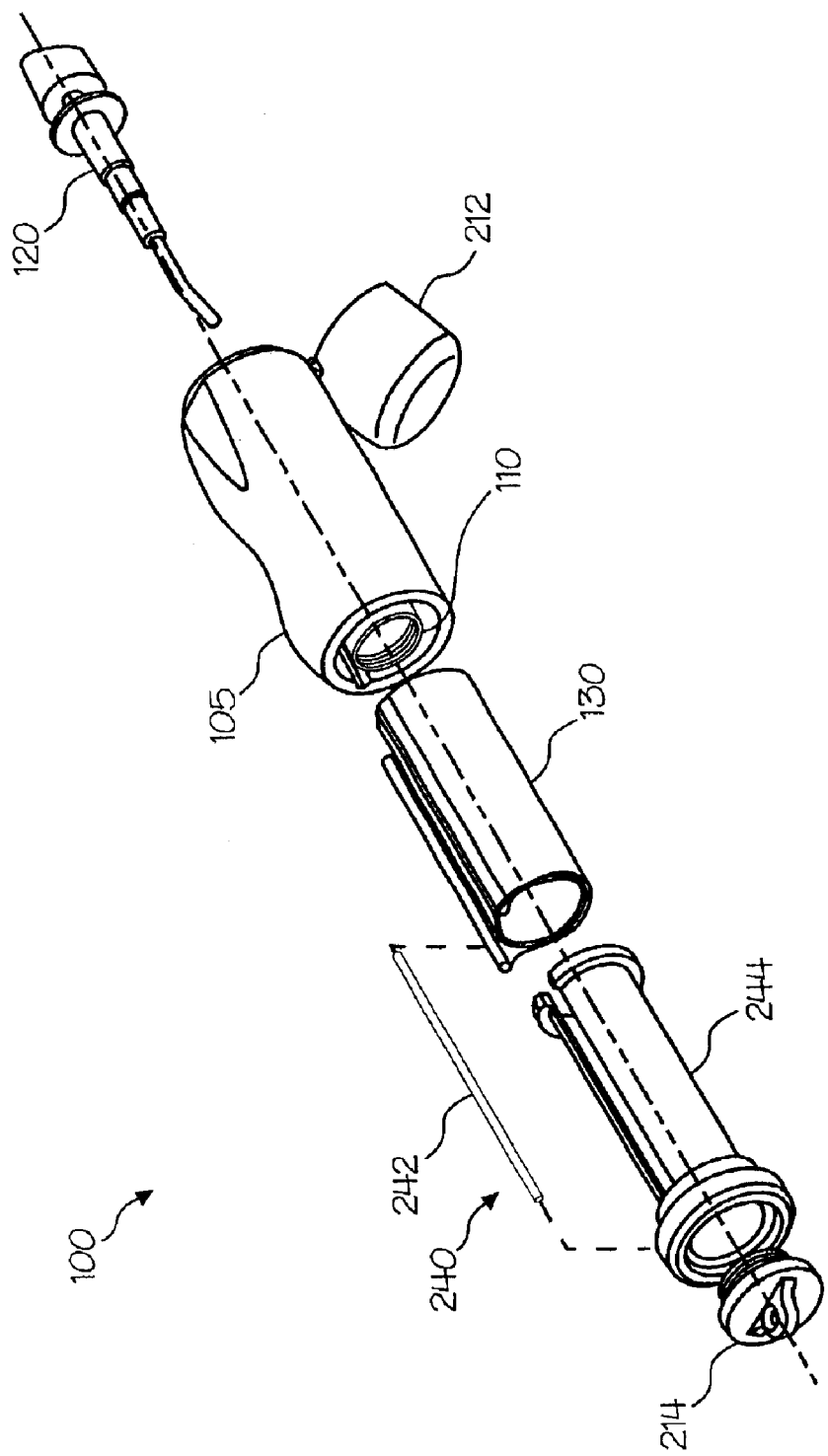
FIG. 2 is an exploded perspective view of the portable cleaning device of FIG. 1.

The present invention integrates several features of a cleaning system into a single device. Referring to FIGS. 1–4C, a portable cleaning device 100 preferably includes a body portion 105 (also referred to herein as "casing") including a cleaning agent reservoir 110 for stowing a cleaning agent, a dispensing mechanism 120 for dispensing the cleaning agent to a desired location and a towel 130 for cleaning and removing soil from the desired location.

Figure 5:
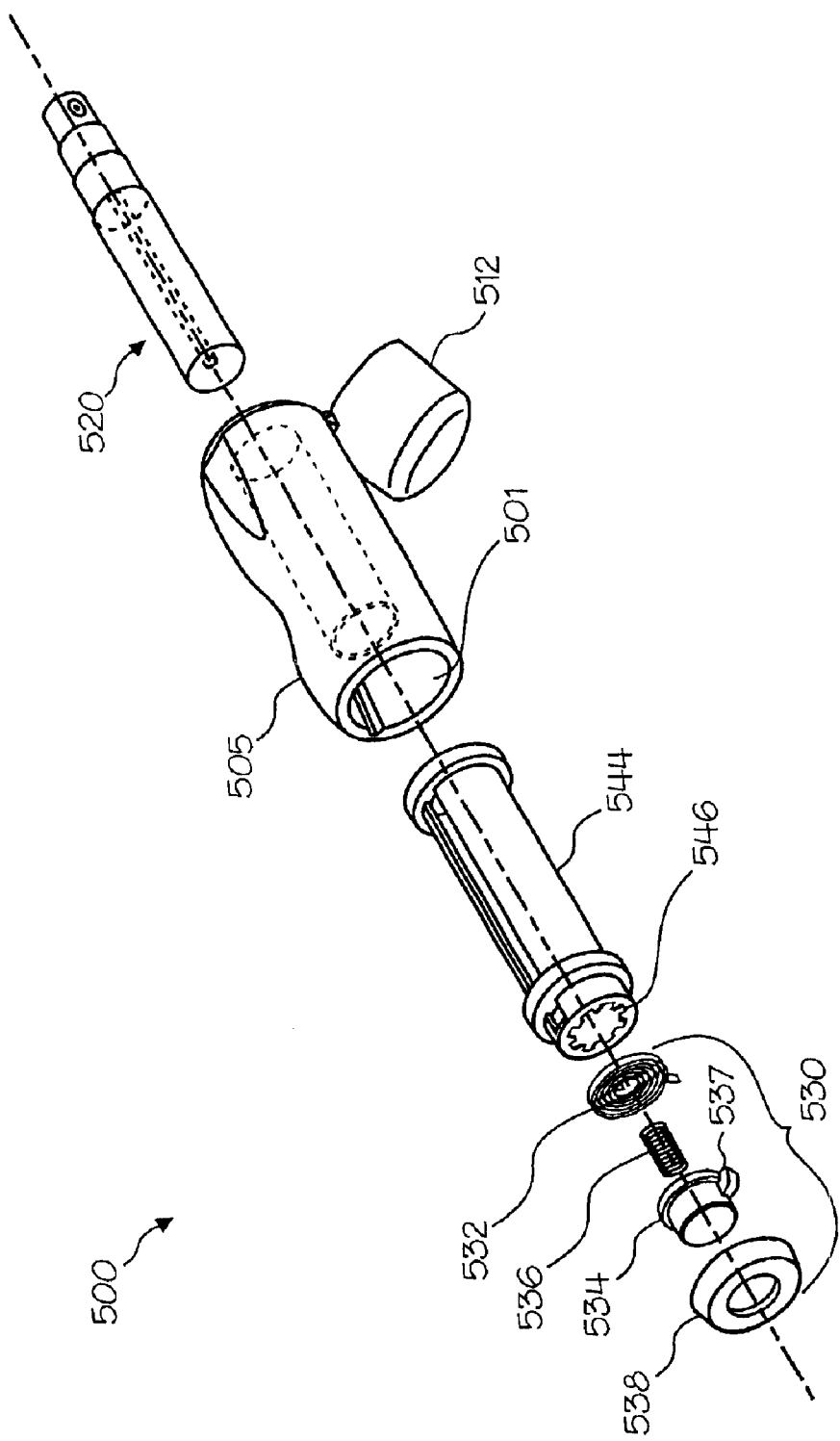
FIG. 5 is an exploded perspective view of a portable cleaning device having spring-loaded retract mechanism according to various other embodiments of the present invention.
Figure 6C:
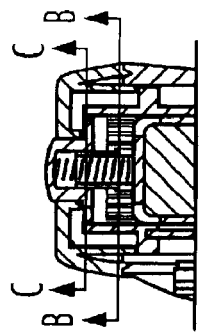
FIGS. 6A–6E illustrate respective cross-sectional back, left side, and cross-sectional end and bottom views of the portable cleaning device of FIG. 5.
Figure 6D:
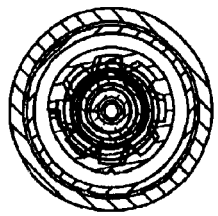
Figure 6E:
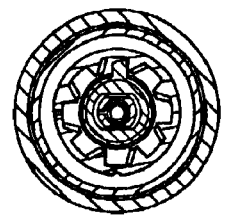
Figure 6B:
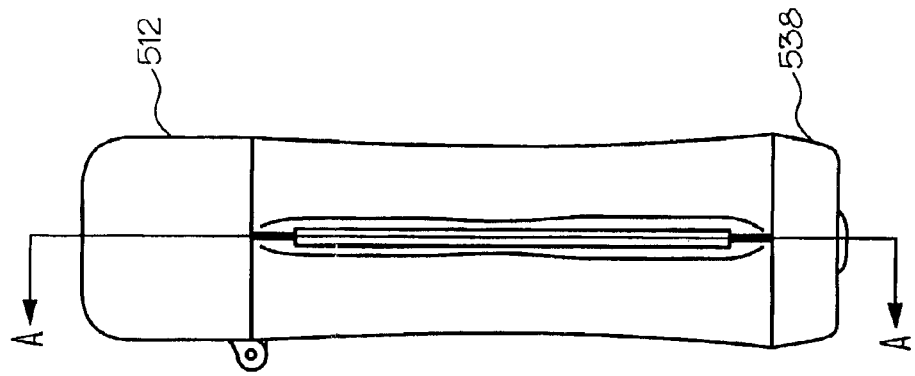
Figure 6A:
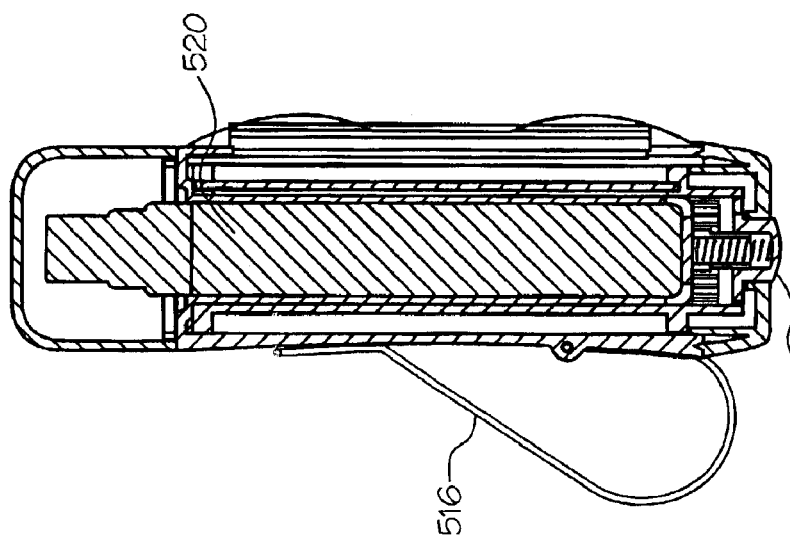

Body portion 105 may be any mechanism having a reservoir 110 or orifice suitable for enclosing a liquid, gel, or dry cleaning agent, or capable of receiving a self-contained apparatus that contains the same. In one embodiment of the invention, body portion 105 comprises a molded plastic casing. Color, shape and selection of materials used for casing 105 is discretionary and may vary depending on the environment for which device 100 will be exposed as well as the type of cleaning agent selected for use. Casing 105 may be flexible or rigid depending on the type material it is made from. Optionally, but preferably, casing 105 includes a reservoir 110 that may be refilled with a liquid cleaning agent through the use of, for example, a removable reservoir cap 214 (FIG. 2) or a removable dispensing mechanism such as pump sprayer 120 (FIG. 2) or self-contained sprayer (e.g., 520; FIG. 5).

Body portion 105 may also include an optional lid 212 to isolate the dispensing mechanism 120 from incidental contact and/or prevent, for example, stored cleaning agent from accidentally discharging or leaking from device 100. Lid 212 may be hinged to, and/or completely removable from body portion 105.

Dispensing mechanism 120 may be any mechanism for transferring a cleaning agent to a desired location, including but not limited to, a nozzle, a hole, or a pump sprayer. In one preferred embodiment, dispensing mechanism 120 is a pumping spray nozzle operative to dispense a liquid cleaning agent such as an alcohol-based cleaner. Dispensing mechanism 120 may be fixed to reservoir 110 or removably attached using, for example, threaded, snap or clamp attachment mechanisms. In alternative embodiments discussed hereafter, dispensing mechanism is a self-contained spray bottle that is accommodated in reservoir 110.

Towel 130 may be any flexible and/or absorbent material for removing cleaning agent and/or soil from the desired location, including but not limited to any type of man-made or naturally occurring fiber, cloth or paper or any combination thereof. In one embodiment of the invention towel 130 comprises an absorbent micro-fiber cleaning cloth, in other embodiments towel 130 is a cotton cloth. Towel 130 is preferably attached to the body portion and most preferably, attached using a retracting mechanism as described in more detail hereafter. In other embodiments towel 130 is a plurality of disposable cloths on a roll and separated by perforations for tearing away used cloths.

Cleaning device 100 may also optionally include retaining mechanism 116 (FIG. 1) for attaching device 100 to a desired location. Any mechanism or combination of mechanisms suitable for this purpose may be used; for example, in one embodiment retaining mechanism 116 comprises a clip for attaching device 100 to a desired surface. Alternatively, or in addition, a hole formed in device 100 and a string or chain also may serve as retaining mechanism 116.

In preferred embodiments of the invention, towel 130 is stored substantially in an interior portion of body portion 105 and may be extended and subsequently retracted by hand or automatically via a towel stowing mechanism 240. Towel stowing mechanism 240 may be any device or combination of devices for enabling a user to utilize towel 130 (e.g., removing soil and/or cleaning agent from a desired surface) and subsequently store towel 130 at least partially within device 100. In one embodiment of the invention, towel stowing mechanism 240 includes a pin 242 and a winder 240.

Towel 130 may be fixed to winder 240 or removable for interchanging towels when desired. In one embodiment, pin 242 is used to secure towel 130 to winder 244 wherein towel 130 extends through a slot in casing 105 of device 100 and may be wound around winder 244 to stow towel 130 substantially inside casing 105. However, pin 242 may be omitted and any means for attaching towel 130 to winder 244 may be used.

A user may extend towel 130 for use simply by pulling on an exposed end of towel 130. Subsequently, winder 244 may be rotated to retract towel 130 substantially inside casing 105. A second pin (not shown) may optionally be attached to the end of towel 130 remaining outside of body portion 105. The second pin may serve to: (i) prevent towel 130 from winding completely inside body portion 105; (ii) assist in keeping towel 130 in a substantially flat and retractable form; and (iii) provide a grip for a user to pull on towel 130. The pins of the present invention may be metal, plastic or any other substantially rigid material that may be suitable for their respectively described purposes.

FIGS. 4A–4C illustrate various views of winder 244 according to one preferred embodiment of the invention. Winder 244 is preferably configured to have a portion 245 that is accessible by a user to wind towel 130 into casing 105. However, winder 244 may be configured with other components to automatically retract as discussed in respect to other embodiments hereafter. Winder 244 also includes a mechanism 246 (FIG. 4C) for attaching towel 130. Mechanism 246 may be any mechanism for fixedly or temporarily attaching towel 130 to winder 244. In one embodiment mechanism 246 includes a slot 247 and a hole 248 for receiving pin 242.

As shown, device 100 also includes optional reservoir cap 214 for retaining liquid cleaning agent in reservoir 110. However, if reservoir 110 is not intended to be refilled, may be refilled by other means (such as removal of dispensing mechanism 120), or is configured to receive a self contained cleaning agent dispenser, cap 214 may be omitted. However, if included, cap 214 is preferably configured to retain cleaning agents within reservoir 110 without leaking using for example, a sealed threaded connection or other sealed fastening means.

Cleaning device 100 of the present invention is an integrated system that is portable and readily enables a user to clean, for example, eyeglasses, sunglasses, golf balls and clubs, compact discs and other optical storage mediums, mirrors and windows (home, office and automobiles), computer screens, cell phones, jewelry, shoes and any other items that a user may desire to clean, using a cleaning agent and a towel.

An exemplary method of cleaning a desired location using cleaning device 100 includes: (i) opening lid 212 on device 100; (ii) dispensing cleaning agent to the desired location by applying pressure to the dispensing mechanism 120; (iii) pulling towel 130 from casing 105; (iv) wiping the desired location with extended towel 130; (v) retracting towel 130 into casing 110; and (vi) closing lid 212.

Turning to FIGS. 5 and 6A–6E, a portable cleaning device 500 according to a second embodiment of the invention includes casing 505, winder 544 and auto retract components 530. Device 500 also includes a towel (not shown) similar to that discussed in respect to previous embodiments.

In preferred implementations casing 505 includes a recess 501 for receiving a self-contained spray apparatus 520. Casing 505 is also configured to receive winder 544 and auto-retract components 530, and optionally includes components for accommodating a cap 512 to enclose spray apparatus 520 inside of device 500.

Winder 544 is similar to winder 244 in previously discussed embodiments optionally omitting exposed winding surface 245 and including one or more ratchet components 546 configured for mating with auto-retract components 530 to provide the spring loaded retract features discussed herein.

Auto-retract components 530 serve to provide spring bias against winder 544 when the towel is in the extended position, and a release mechanism to facilitate user-initiated retracting of the towel into casting 505. Auto retract components may be any mechanism or combination of mechanisms to facilitate these purposes. In preferred implementations, auto-retract components 530 include clockwork spring 532, push button 534, push button spring 536 and end cap 538. Push button 536 includes one or more prawls 537 for engaging with ratchet components 546 of winder 544.

Auto retract components 530 are arranged in device 500 such that when the towel is extended, a user may depress a portion of push button 534 extending through end cap 538 to disengage prawl 537 from ratchet components 546. Once prawl 537 is disengaged from ratchet components 546, winder 544 rotates back to its original towel stowing position, by virtue of clockwork spring 532, and thus retracting the towel into casing 505.

The skilled artisan will recognize that there are many possible alternative arrangements of mechanical parts that could provide user initiated auto-retract features of the present invention. All such arrangements that provide equivalent functionality are within the scope of the present invention.

As previously discussed, the embodiments of the present invention may be configured to receive self-contained spray bottles. Accordingly, the device of the present invention may be configured to accommodate commercially available portable spray cleaners such as: Natural Eyes and Shinize brand cleaners available from Quality Accessories, Inc., SEE SPRAY® brand cleaner available from QUIXTAR, Ultra Clarity brand lens cleaner available from Nanofilm, and the like. Alternatively, the device may include its own self-contained refillable spray bottle.

Unless contrary to physical possibility, the inventor envisions the methods and systems described herein: (i) may be performed in any sequence and/or combination; and (ii) the components of respective embodiments combined in any manner.

Although there have been described preferred embodiments of this novel invention, many variations and modifications are possible and the embodiments described herein are not limited by the specific disclosure above, but rather should be limited only by the scope of the appended claims.

The invention claimed is:

1. A portable cleaning device comprising:

a casing having a towel extending opening;

a winder disposed inside of the casing; and a reusable cloth towel attached on a first end thereof to the winder and a second end thereof exposed outside of the casing through the towel extending opening, wherein said winder is configured allow a user to extend the reusable cloth towel from the casing to a first position for cleaning, and to retract the reusable cloth towel to a second position in the casing for storage; and a spring-biased retract mechanism operative to retract the reusable cloth towel from the first position to the second position upon initiation of the spring-biased retract mechanism by a user.

2. The device of claim 1 wherein the reusable cloth towel may be retracted into the casing around said winder.

3. The device of claim 1 wherein the casing includes a receptacle for accommodating a cleaning agent.

4. The device of claim 3 wherein the receptacle is configured to receive a cleaning agent delivery apparatus.

5. The device of claim 3 further comprising a cap operative to enclose the receptacle.

6. The device of claim 1 further comprising a spray mechanism disposed in said casing and operative to deliver a provided cleaning solution to a desired location.

7. The device of claim 6 wherein the spray mechanism comprises spray nozzle.

8. The device of claim 6 wherein the spray mechanism comprises a self-contained spray apparatus.

9. The device of claim 1 wherein the cloth comprises a micro-fiber cloth.

10. The device of claim 1 wherein the cloth comprises a cotton cloth.

11. The device of claim 1 further comprising a retaining mechanism operative to attach the device to a desired location.

12. The device of claim 11, wherein the retaining mechanism is a clip.

13. A portable cleaning system comprising:

a body portion having an opening and a receptacle;

a towel stowed in the body portion and configured to be extended through said opening by pulling on the towel;

a spray mechanism disposed in said receptacle and operative to deliver a cleaning agent to a desired area; and a towel retract mechanism configured to enable a user to retract the towel from an extended position into the body portion, wherein the towel retract mechanism comprises a spring-loaded mechanism operative to retract the towel into the body portion upon pushing of a button.

14. A portable device for cleaning objects, the device comprising:

a casing including spray means for applying a cleaning agent, wiping means for removing applied cleaning agent and/or soil, winding means for extending and retracting the wiping means between a first extended position and a second retracted position, wherein the winding means includes spring-loaded means for automated retraction of said wiping means.

15. A portable cleaning device comprising:

a casing having a towel extending opening;

a winder movably attached inside of the casing;

a spring-biased retract mechanism in communication with the winder and casing;

an absorbent towel attached on a first end thereof to the winder and a second end thereof exposed outside of the casing, wherein the towel may be extended from the casing through the towel extending opening by pulling on the second end and wherein the towel may be retracted by initiating the spring-biased retract mechanism; and a clip disposed on an outer surface of the casing for attaching the portable cleaning device to a desired surface.

16. The portable cleaning device of claim 15 further comprising:

a spray bottle, and wherein the casing includes a receptacle adapted to hold the spray bottle substantially within the casing.

17. The portable cleaning device of claim 15 wherein the absorbent towel comprises a micro-fiber cloth.

18. The portable cleaning device of claim 15 wherein the absorbent towel comprises a cotton cloth.

19. The portable cleaning device of claim 15 wherein the absorbent towel comprises a disposable material.

* * * * *